United States Patent [19]

Mizuno et al.

[11] Patent Number: 5,178,586
[45] Date of Patent: Jan. 12, 1993

[54] TOOTHED BELT

[75] Inventors: Takahide Mizuno; Nobutaka Osako; Takeshi Murakami, all of Hyogo, Japan

[73] Assignee: Mitsuboshi Belting Ltd., Nagata, Japan

[21] Appl. No.: 728,151

[22] Filed: Jul. 10, 1991

[30] Foreign Application Priority Data

Jul. 10, 1990 [JP] Japan .................. 2-73484[U]

[51] Int. Cl.⁵ .................................. F16H 1/04
[52] U.S. Cl. ........................ 474/266; 474/268
[58] Field of Search ................. 474/260-268

[56] References Cited

U.S. PATENT DOCUMENTS

| | | | |
|---|---|---|---|
| 4,721,496 | 1/1988 | Yokoyama et al. | 474/268 X |
| 4,737,138 | 4/1988 | Komai et al. | 474/266 |
| 4,813,919 | 3/1989 | Nosaka et al. | 474/266 |

FOREIGN PATENT DOCUMENTS

| | | |
|---|---|---|
| 0393344 | 10/1990 | European Pat. Off. . |
| 3603646 | 10/1986 | Fed. Rep. of Germany . |
| 62-7414 | 2/1987 | Japan . |
| 2-68847 | 3/1990 | Japan . |
| 2161837 | 1/1986 | United Kingdom . |

Primary Examiner—Thuy M. Bui
Attorney, Agent, or Firm—Wood, Phillips, VanSanten, Hoffman & Ertel

[57] ABSTRACT

A canvas cover for placement over an exposed surface of a power transmission belt having a length and width, which canvas cover consists of a yarn defining a weft for extension in the longitudinal direction with respect to a belt on which the canvas cover is to be placed, and a twisted yarn defining a warp for extension in the widthwise direction with respect to a belt on which the canvas cover is to be placed. The warp yarn is preferably made up of from 3-15 twisted mono-filaments each of 10-50 denier with a total denier of 210d.

23 Claims, 1 Drawing Sheet

TOOTHED BELT

BACKGROUND OF THE INVENTION

1. Field of the Invention

This invention relates to toothed power transmission belts and, more particularly, to a toothed belt with a canvas cover thereon which accounts for excellent dimensional stability and resistance to abrasion in use.

2. Background Art

Toothed power transmission belts are used in many diverse environments. The toothed belt is particularly valuable in environments in which it is required to operate under heavy load, at high speeds and at high temperatures. Under such conditions, the teeth are prone to deterioration. The severe shearing stresses on the teeth often result in crack generation and severance of the teeth, which may render the entire belt unusable.

To alleviate the above problems, it is known to place a canvas cover over the belt teeth. It is known to form the canvas using relatively inextensible yarn for the warp, which yarns align widthwise of the belt. It is also known to use weft yarns having woolie finished contracted nylon fibers with the weft yarns aligning in the lengthwise direction of the belt.

During woolie processing, the denier of the yarns affects the contraction rate. This contraction is significant particularly with thin filaments. It is known in the art, to control the contraction rate, to use multi-filaments of about 40 denier which are defined by accumulated filaments, each of three to four denier.

While the advantages of improved resistance to tooth shearing and abrasion are enhanced up to a certain point by increasing the number and thickness of the twisted yarns, above a certain point there is a detrimental affect that results. Excessive yarn size and number may detrimentally alter the PLD value of the belt. The PLD is equal to the distance between the center of the load carrying cords of a belt and the bottom surface of the groove between adjacent, longitudinally spaced teeth. The PLD value is a critical dimension that must be controlled to insure a sufficient engagement between the toothed portions of the belts and the cooperating pulleys.

For the above reasons, it has been proposed in the art to use a canvas cover yarn in which a) the weft is formed by twisting yarn of not less than 210d with a twisting coefficient of not less than 1.5 and b) the warp is formed of a twisted yarn or mono-filament yarn, with the warp and weft woven with a cover factor of not greater than 10. Such an arrangement is disclosed in Japanese Patent Laid-Open No. 62-7414.

In conventional toothed belts, the pressure on the canvas cover, and consequently the critical PLD value, depends on a variety of factors, including: a) the pressure exerted by the tension members/load carrying cords on the canvas cover; b) the tension member diameter; c) the tension member winding pitch; and the like. For example, in an exemplary belt, the warp yarns in the adhesive rubber layer of the belt reside outside of the load carrying cords. During manufacture, the load carrying cords, when wrapped as around a forming drum, cause an exaggerated wavy pattern for the warp yarns. This results in an increase in the PLD value.

Due to the above variables, belts constructed according to prior art techniques have generally had inconsistent and oft times unpredictable PLD values.

SUMMARY OF THE INVENTION

The present invention is specifically directed to overcoming the above enumerated problems in a novel and simple manner.

It is a principle objective of the present invention to afford a canvas cover layer for a power transmission belt with a stiffened warp that reduces possible deformation thereof under pressure, particularly applied through load carrying members. By doing so, the PLD variation from belt to belt is minimized, resulting in the PLD value being closer to the intended design. At the same time, wear on the weft is minimized.

More particularly, the present invention contemplates a canvas cover for placement over an exposed surface of a power transmission belt having a length and width, which canvas cover consists of a yarn defining a weft for extension in the longitudinal direction with respect to a belt on which the canvas cover is to be placed, and a twisted yarn defining a warp for extension in the widthwise direction with respect to a belt on which the canvas cover is to be placed. The warp yarn is preferably made up of from 3-15 twisted mono-filaments each of 10-50 denier.

The weft yarn is preferably a stretchable yarn. Preferably, the warp yarn has a denier of at least 210d.

The invention thus contemplates a relatively large diameter and rigid yarn used for the warp of the canvas cover. This limits the normal contraction of the canvas cover and warp in the widthwise direction to afford a dimensionally stable canvas cover. This dimensional stability is beneficial in the manufacturing process, particularly during the adhesive processing step.

Still further, the rigid warp yarn remains dimensionally stable even under the forces normally applied through the load carrying members so that the warp yarns retain a relatively straight orientation. This will maintain the PLD value closer to the design value for the belt. By maintaining a stable PLD value, the abrasion resistance of the weft is increased so that a more durable belt of longer life will result.

In one form, the warp yarn is made of an aliphatic group fiber.

The warp yarn is a filament yarn that is at least one of polyester, a polyamide which is at least one of nylon-6, nylon-66, nylon-46 and nylon-12, polyvinyl alcohol, polyethylene, and polypropylene.

In one form, the mono-filaments of the yarn are twisted from between 5-30 turns per 10 cm.

The weft yarns are preferably made from at least one of polyester, a polyamide which is at least one of nylon-6, nylon-66, nylon-46, and nylon-12, polyvinyl alcohol, polyethylene, polypropylene and an aromatic polyamide fiber.

The weft yarn is preferably a stretchable yarn formed by twisting a spun yarn that has at least 40 percent by weight of aromatic polyamide fiber with a urethane elastic yarn.

The aromatic polyamide fiber spun yarn includes a polyamide fiber having an aromatic ring in the main chain of the molecular structure thereof.

The weft yarn in one form is a spun yarn comprising an aromatic polyamide fiber and another fiber. In another form, the weft yarn is a twisted yarn that is an aromatic polyamide fiber spun yarn with another fiber and a urethane elastic yarn.

preferably, the aromatic polyamide fiber is at least 40 percent by weight of the weft.

The ratio between the weft and warp yarns is preferably in the range of 1:1 to 2:1.

The warp and weft yarns may be formed into one of a plain weave fabric, twill fabric, and stain elastic webbing fabric.

The canvas cover has an adhesive covering layer that is preferably one of RFL solution, isocyanate solution, and epoxy solution.

The invention further contemplates a toothed power transmission belt with longitudinally spaced drive teeth thereon having the canvas cover layer described above over the drive surface of the belt including the teeth thereon.

DETAILED DESCRIPTION OF THE DRAWINGS

Figure 1:
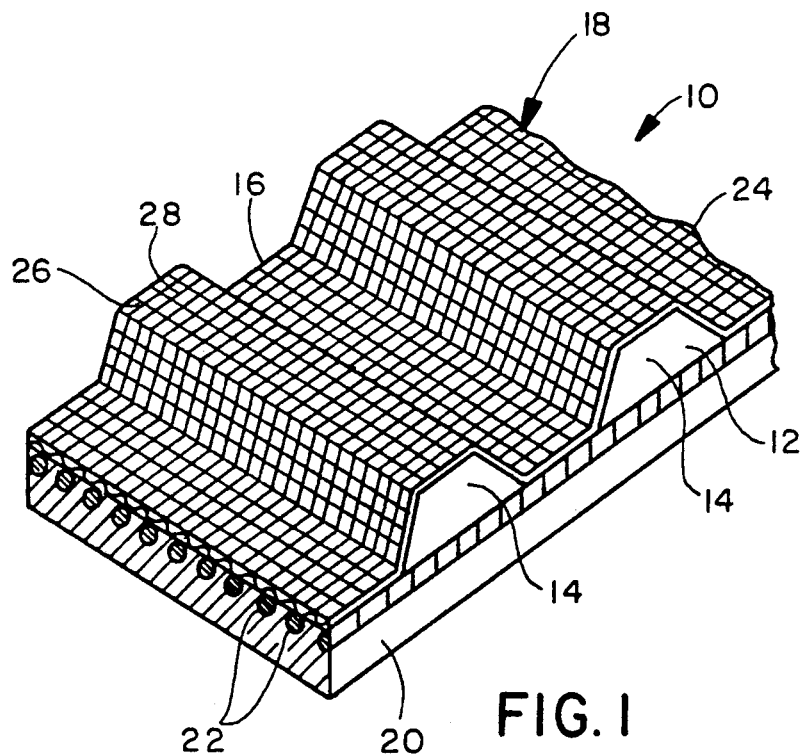
FIG. 1 is a cross-sectional, perspective view of a toothed belt according to present invention.

In FIG. 1, a toothed power transmission belt, according to the present invention, is shown at 10 and includes a belt body 12 having laterally extending, longitudinally spaced, teeth 14. A groove 16 is defined between adjacent teeth 14. A drive surface 18 is defined by the teeth 14 and that portion of the belt body 12 bounding the grooves 16. The drive surface 18 cooperates with a complementary pulley (not shown).

The belt body 12 has a backing rubber layer 20 with a plurality of load carrying cords 22 embedded therein, spaced equidistantly along the width of the belt 10, and extending longitudinally/in a lengthwise direction relative to the belt 10. The load carrying cords 22 are made of at least one of glass fiber, aromatic polyamide fiber, carbon fiber, or the like. The centers of the load carrying cords 22 define the neutral belt axis/pitch line. A continuous canvas cover layer 24 is adhered to the drive surface 18 over the longitudinal extent of the belt 10.

The belt body 12 is made from a rubber composition which has better resistance to aging at high temperatures than conventional diene system rubber such as natural rubber, styrene-butadiene rubber and acrylonitrile-butadiene rubber. The preferred rubber material for the belt body 12 is at least one of chloroprene rubber, chlorosulfonated polyethylene rubber (CSM), alkylated chlorosulfonated polyethylene rubber (ACSM), and hydrogenated acrylonitrile-butadiene rubber (hydrogenated NBR) formed so that hydrogen is added to the double-bonded portion of the acrylonitrile-butadiene rubber. These rubber materials exhibit improved resistance to aging over conventional rubber materials at high temperatures.

The above alkylated chlorosulfonated polyethylene rubber (ACSM) is formed by chlorosulfonating a low density polyethylene having a straight chain molecular structure so that the chlorine content falls within a range of between 15 and 45 percent by weight and the sulfur content falls within a range of between 0.5 and 2.5 percent by weight. Since the ACSM has an alkyl side chain, the polyethylene crystallization of the principle chain is reduced, so that the ACSM exhibits rubber-like properties. Further the ACSM is hardly crystallized, even at low temperatures, such as below −10° C., to maintain a rubber-like elasticity and therefore an excellent resistance to wear at low temperatures.

The canvas cover 24 has warp and weft yarns 26,28 respectively, with the warp yarns 26 extending widthwise/laterally of the belt 10 and the weft yarns 28 extending longitudinally/lengthwise of the belt 10. The warp yarns 26 are preferably made of at least one of an aliphatic group fiber, a filament yarn of, for example, polyester, a polyamide such as nylon-6, nylon-66, nylon-46, and nylon-12, polyvinyl alcohol, polyethylene, and polypropylene.

The warp yarn 26 is formed by putting together 3–15 units of a mono-filament of 10–15 denier and twisting the mono-filaments around each other 5–30 turns per 10 cm in either the "S" or "Z" direction. The resulting yarn 26 has a diameter preferably greater than 210 denier.

When the mono-filament has a diameter of less than 10 denier, its rigidity is such that it is too flexible and bends too readily. When the mono-filament has a diameter greater than 50 denier, the resulting canvas 24 has an excessive thickness which makes it difficult to control the PLD value.

Preferably, 3–15 units of the mono-filament are twisted together. When two or fewer units of the mono-filament are put together, the canvas 24 has an excessively rough surface after the contraction process, which is clearly undesirable. A single mono-filament is similarly not preferred as it cannot be effectively woven.

The weft yarn 28 is a yarn that is either made of the same material as that of the warp yarn 26 or one of an aromatic polyamide filament contracted by 50–60% and a stretchable yarn. The stretchable yarn is a twisted yarn formed by twisting a spun yarn including at least 40 percent by weight, and more preferably 50 percent by weight, aromatic polyamide fiber with a urethane elastic yarn. The aromatic polyamide fiber spun yarn includes a polyamide fiber having an aromatic ring in the main chain of the molecular structure thereof which is, for example, any one of the products sold commercially under the trademarks CORNEX, NORMEX, KEVLAR or TECHNORA.

The weft yarn 28 may also be a spun yarn made up of an aromatic polyamide fiber and another fiber, or a twisted yarn made up of an aromatic polyamide fiber spun yarn, another fiber, and a urethane elastic yarn. The content of the aromatic polyamide fiber is preferably no less than 40 percent by weight and preferably 50 percent by weight of the weft. In the absence of the aromatic polyamide fiber being present in this weight percent, the weft does not show the desired improved heat and abrasion resistance over prior art belts.

The urethane elastic yarn is desirable in that it gives stretchability to the cover canvas. Since the toothed portion of the belt is molded under pressure before vulcanization, the canvas must have stretchability of at least 70 percent. The urethane elastic yarn affords this amount of stretchability. The urethane elastic yarn is incorporated into the twisted yarn in a stretched state during the weaving process, and, after being woven, is contracted.

The preferred relationship between the weft yarn 28 and warp yarn 26 is 1:1 to 2:1.

The canvas cover 24 described above is then formed into a plain weave fabric, twill fabric, or stain elastic webbing fabric having good stretchability in the weftwise direction, i.e. the lengthwise direction of the belt.

The plain weave fabric has a construction so that the weft yarn 28 and warp yarn 26 are crossed alternatingly over and under each other. This produces a wavy configuration at every crossing points.

With the twill fabric or stain elastic webbing fabric used for the canvas cover 24, the warp warns 26 and weft yarns 28 do not cross over and engage each other at every intersection point as with the plain weave fabric. The result is that the rubber permeates between the yarns even at a number of the cross-over points for the yarns, whereas this does not occur with the plain weave fabric. The life of the canvas layer with the twill fabric and stain elastic webbing fabric is enhanced by reason of the avoidance of the direct contact between the warp yarns 26 and weft yarns 28 at their points of crossing.

To adhere the canvas cover 24, the canvas cover 24 is first covered with an adhesive layer made of at least one of RFL solution, isocyanate solution, and epoxy solution, which is applied onto the surfaces of the warp yarns 26 and weft yarns 28.

Testing

The inventive canvas cover 24 was tested for performance in operation on toothed belts. The results of these tests are summarized below.

EXAMPLES

Yarns as listed in Table 1 were twilled in 2×2 form and then processed by a wince or circular machine at 80° C. for three minutes to contract the fabric by 50 percent in the widthwise direction. The contraction rate for each of the tested canvas samples, as well as the deformation of the weft yarns per 1000 mm for the samples, was measured in the warpwise/widthwise belt direction. The results of this experiment are shown in the following Table 1.

Each of the canvas samples in Table 1 was treated with RFL solution (resorsinal-formalin-latex adhesive treating solution) which is conventionally used as an adhesive treating solution, and then impregnated with rubber glue formed by dissolving a rubber composition, the same as that making up the toothed belt body, in a solvent. Each canvas sample, as treated, was dried and used as a canvas cover for a toothed belt.

The tension members employed were adhesive-treated glass cords of 1.2 mm in diameter having ECG150-3/13 structure.

The belt body and the backing rubber layer were a rubber composition made by processing a chloroprene rubber material.

The above-mentioned materials were vulcanized at 160° C. for thirty minutes according to a conventional press-fitting method to obtain each toothed belt sample.

Each belt constructed had the following dimensions:
tooth pitch = 8 mm;
tooth form = STPD;
tooth number = 99;
tooth width = 19.1 mm; and
PLD value (designed value) = 0.686 mm.

The resulting belts were cut in a widthwise direction and the PLD value measured by a microscope. Each belt was subjected to the following operating test and measured for wear performance of the weft which was determined visually through a microscope.

The test device consisted of a 20-toothed drive pulley and three 20-toothed driven pulleys spaced from each other vertically and horizontally in a plane to have parallel rotational axes. An idler pulley, having a 32 mm diameter, was placed against the belt between adjoining pulley units.

TABLE 1

| Canvas No. | A | B | C | D | E |
|---|---|---|---|---|---|
| Warp | Nylon-66 210d 4d/70 units 15 turns/10 cm | Nylon 6 210d mono-filament | Nylon 6 210d 30d-7 units 15 turns/10 cm | Nylon-66 210d 4d-52 units 15 turns/10 cm | Nylon-6 210d 31d/7 units 15 turns/10 cm |
| Weft | Nylon-66 280d 4d/70 units (contraction rate: 50%) 15 turns/10 cm | Nylon-66 280d 4d/70 units (contraction rate: 50%) 15 turns/10 cm | Nylon-66 280d 4d/70 units (contraction rate: 50%) 15 turns/10 cm | Aramid fiber 280d 6d/47 units (contraction rate: 50%) 15 turns/10 cm | Aramid fiber 280d 6d/47 units (contraction rate: 50%) 15 turns/10 cm |
| Warpwise contraction rate (%) | 9.2 | 2.3 | 2.5 | 14.3 | 3.2 |
| Canvas Deformation amount (mm) | 35 | 80 | 23 | 48 | 25 |

The results, seen in Table 1, demonstrate that each of the canvas samples C & E, which have their warp yarns defined by twisting together 3-15 units of mono-filament of 10-50 denier, had a reduced warpwise contraction rate and small deformation compared to the other belts A, B, and D that were tested. The result is a dimensionally stable fabric system which facilitates belt manufacture, and particularly the application of the canvas cover 24 in the adhesive bonding stage.

Each belt was wound around the four pulley units while a tension force of 80 kilograms was applied through one of the driven pulley units. The rotational speed was 5500 rpm at an ambient temperature of 120° C. After 300 hours of operation, the wear performance of the canvas cover located at the bottom portion of each belt was observed. The results of these tests are shown in Table 2 below.

TABLE 2

|  | Comparative | | | | | | Example | | |
| --- | --- | --- | --- | --- | --- | --- | --- | --- | --- |
|  | 1 | 2 | 3 | 4 | 5 | 6 | 1 | 2 | 3 |
| Canvas No. | A | A | A | B | B | B | C | C | E |
| Tension member pitch a/b* | 0.85 | 0.75 | 0.75 | 0.85 | 0.75 | 0.75 | 0.75 | 0.75 | 0.75 |
| Tension member tension (kgf) | 6 | 6 | 10 | 6 | 10 | 10 | 6 | 10 | 10 |
| PLD value (mm) Designed value (0.686 mm) | 0.717 | 0.698 | 0.662 | 0.702 | 0.696 | 0.690 | 0.697 | 0.692 | 0.692 |
| Weft wear amount (%) | 29.9 | — | — | 50.5 | — | — | 20.1 | — | 18.5 |

*a: Tension member diameter
b: Tension member interval

As can be seen from the results in Table 2, the inventive toothed belts tested had a PLD value close to the designed value and the cover canvas exhibited excellent abrasion resistance.

Figure 2:
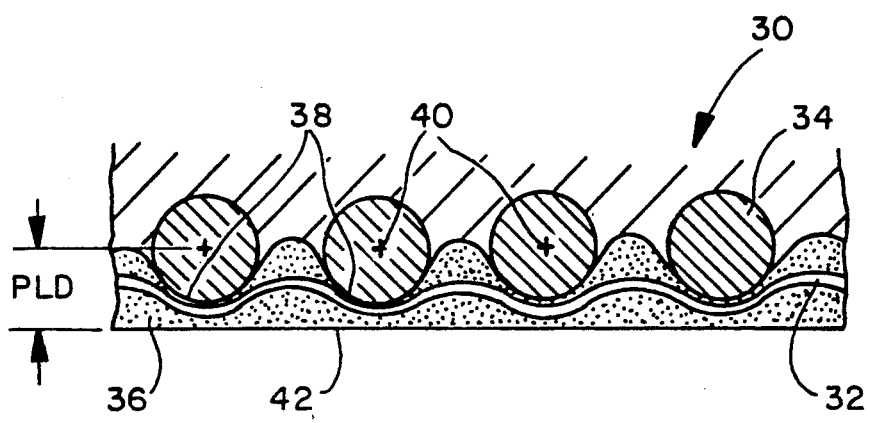
FIG. 2 is a cross-sectional view of a prior art belt showing the relationship between the canvas cover layer and load carrying cords.

In FIG. 2 herein, some of the problems associated with prior art belts, overcome by the present invention, can be seen. An exemplary belt at 30 in FIG. 2 is taken in cross-section to show the warp yarns 32, extending in a lateral belt direction, and the load carrying cords 34 extending lengthwise of the belt. It can be seen that the cords 34, once wrapped against the adhesive rubber layer 36 in which the warp yarns 32 are embedded, define depressions 38 which cause a radically wavy pattern for the normally straight warp yarns 32. This causes a change in the PLD value measured from the centers 40 of the cords 34 to the bottom surface 42 of the belt groove. That is, the PLD value undesirably varies from the designed value for the belt.

The foregoing disclosure of specific embodiments is intended to be illustrative of the broad concepts comprehended by the invention.

We claim:

1. A canvas cover for placement over an exposed surface of a power transmission belt having a length and width, said canvas cover comprising:
   a yarn defining a weft for extension in the longitudinal direction with respect to a belt on which the canvas cover is to be placed; and
   a twisted yarn defining a warp for extension in the widthwise direction with respect to a belt on which the canvas cover is to be placed,
   said warp yarn made up of from 3-15 twisted mono-filaments each of 10 to 50 denier.

2. The canvas cover according to claim 1 wherein the warp yarn has a denier of at least 210 d.

3. The canvas cover according to claim 2 wherein the warp yarn is made of an aliphatic group fiber.

4. The canvas cover according to claim 2 wherein the warp yarn is a filament yarn that is at least one of polyester, a polyamide which is at least one of nylon-6, nylon-66, nylon-46, and nylon-12, polyvinyl alcohol, polyethylene, and polypropylene.

5. The canvas cover according to claim 1 wherein the mono-filaments of the warp are twisted from between 5-30 turns per 10 centimeters.

6. The canvas cover according to claim 1 wherein the weft yarns are made from at least one of polyester, a polyamide which is at least one of nylon-6, nylon-66, nylon-46, and nylon-12, polyvinyl alcohol, polyethylene, polypropylene and an aromatic polyamide fiber.

7. The canvas cover according to claim 6 wherein the weft yarn is contracted by 50-60%.

8. The canvas cover according to claim 1 wherein the weft yarn is a stretchable yarn comprising a twisted yarn formed by twisting a spun yarn that has at least 40% by weight of aromatic polyamide fiber with a urethane elastic yarn.

9. The canvas cover according to claim 8 wherein the aromatic polyamide fiber spun yarn includes a polyamide fiber having an aromatic ring in the main chain of the molecular structure thereof.

10. The canvas cover according to claim 9 wherein the polyamide fiber is at least one of commercially available fibers sold under the trademarks CORNEX, NORMEX, KEVLAR and TECHNORA.

11. The canvas cover according to claim 1 wherein the weft yarn is a spun yarn comprising an aromatic polyamide fiber and another fiber.

12. The canvas cover according to claim 1 wherein the weft is a twisted yarn comprising an aromatic polyamide fiber spun yarn, another fiber and a urethane elastic yarn.

13. The canvas cover according to claim 1 wherein the weft yarn comprises an aromatic polyamide fiber of at least 40% by weight.

14. The canvas cover according to claim 1 wherein the ratio between the weft and warp yarns is 1:1 to 2:1.

15. The canvas cover according to claim 1 wherein the warp and weft yarns are formed into at least one of a plain weave fabric, twill fabric, and stain elastic webbing fabric.

16. The canvas cover according to claim 1 wherein the canvas cover has an adhesive covering layer that is one of RFL solution, isocyanate solution, and epoxy solution.

17. A toothed power transmission belt comprising:
   a plurality of drive teeth extending widthwise/laterally of the belt and being spaced at predetermined intervals longitudinally of the belt so as to define an exposed drive surface defined by said teeth and grooves between adjacent teeth;
   a backing rubber layer;
   a plurality of load carrying members embedded in the backing rubber layer and extending longitudinally of the belt; and
   a canvas cover on said drive surface,
   said canvas covering having a yarn defining a weft for extension in the longitudinal belt direction,
   said canvas covering having a yarn defining a warp for extending in the widthwise belt direction,
   said warp being made up of from 3-15 twisted filaments each of 10 to 50 denier.

18. The toothed power transmission belt according to claim 17 wherein the warp has a denier of at least 210d.

19. The toothed power transmission belt according to claim 18 wherein the warp yarns are twisted from between 5-30 turns per 10 centimeters.

20. The toothed power transmission belt according to claim 18 wherein the weft yarn is a stretchable yarn comprising yarn formed by twisting a spun yarn that has at least 40% by weight of aromatic polyamide fiber with a urethane elastic yarn.

21. The toothed power transmission belt according to claim 18 wherein the ratio between the weft and warp yarns is 1:1 to 2:1.

22. The toothed power transmission belt according to claim 18 wherein the warp and weft yarns are formed into one of a plain weave fabric, twill fabric, and stain elastic webbing fabric.

23. The toothed power transmission belt according to claim 18 wherein the canvas cover has an adhesive covering layer that is one of RFL solution, isocyanate solution, and epoxy solution.

* * * * *